United States Patent [19]

Pierson

[11] 3,781,722

[45] Dec. 25, 1973

[54] DIGITALLY VARIABLE DELAY TIME SYSTEM

[75] Inventor: Paul Bruce Pierson, Delran, N.J.

[73] Assignee: RCA Corporation, New York, N.Y.

[22] Filed: Mar. 12, 1973

[21] Appl. No.: 340,544

[52] U.S. Cl. ............ 333/31 R, 333/28 R, 333/81 A

[51] Int. Cl. ........................... H03h 7/22, H03h 7/30

[58] Field of Search ............... 333/31 R, 28 R, 81 A

[56] References Cited

UNITED STATES PATENTS 3,583,065 6/1971 Holland et al. ................... 333/31 X

*Primary Examiner*—Rudolph V. Rolinec
*Assistant Examiner*—Marvin Nussbaum
*Attorney*—Edward J. Norton et al.

[57] ABSTRACT

A system for providing a digitally variable delay time for electrical signals utilizes a connection of multiple delay line sections each of which contributes to the overall system delay time. Each delay line section comprises first and second selectable transmission lines having different electrical lengths and a different magnitude of attenuation per unit length.

4 Claims, 2 Drawing Figures

DIGITALLY VARIABLE DELAY TIME SYSTEM

The invention herein described was made in the course of or under a contract or subcontract thereunder with the Department of the Air Force.

BACKGROUND OF THE INVENTION

1. Field of the Invention

This invention relates to variable delay time systems and more particularly to digitally variable delay time systems.

2. Description of the Prior Art

Systems for providing digitally variable time delays for electrical signals transmitted over a desired frequency bandwidth from an input port to an output port of the system are well known in the prior art. One type of prior art variable time delay system provides for the transmission of an electrical signal through a number of multiple delay line sections. Each prior art delay line section of such a known system includes a first switchable electrical signal transmission path of negligible delay time and at least a second switchable electrical signal transmission path having a greater predetermined delay time relative to the first transmission path. The prior art digitally variable time delay systems had a disturbing amplitude modulating effect on the output signal. Therefore, the second transmission path in each prior art delay line section also includes an attenuation equalizer element designed to compensate for variations in attenuation between the first and second switchable transmission paths. The use of an attenuation equalizer element in each such delay line section has proved to be a difficult and uneconomical solution to the problem of compensating for variations in attenuation between the first and second switchable delay line section transmission paths.

SUMMARY OF THE INVENTION

A system is provided for a digitally variable delay time of electrical signals transmitted over an operating frequency bandwidth from a system input terminal to a system output terminal through a connection of multiple delay line sections. Each delay line section has a first selectable transmission path of negligible delay time and a second selectable transmission path having a predetermined delay time relative to the first transmission path delay time. The first transmission path is a predetermined length of electrical transmission line having a predetermined magnitude of signal attenuation per unit length over the operating frequency bandwidth. The second transmission path is an electrical signal transmission line having a predetermined length electrically longer than the predetermined length of the first signal transmission line and having a predetermined magnitude of signal attenuation per unit length less than the predetermined magnitude of signal attenuation per unit length of the first electrical signal transmission line, to cause signal attenuation in the first and second electrical signal transmission lines to be equal over the operating frequency bandwidth. Means are provided for selecting the first and second transmission paths of the delay line sections.

These and other features and advantages of the invention will be better understood from a consideration of the following specification taken in conjunction with the accompanying drawing in which:

DESCRIPTION OF THE PREFERRED EMBODIMENT

Figure 1:
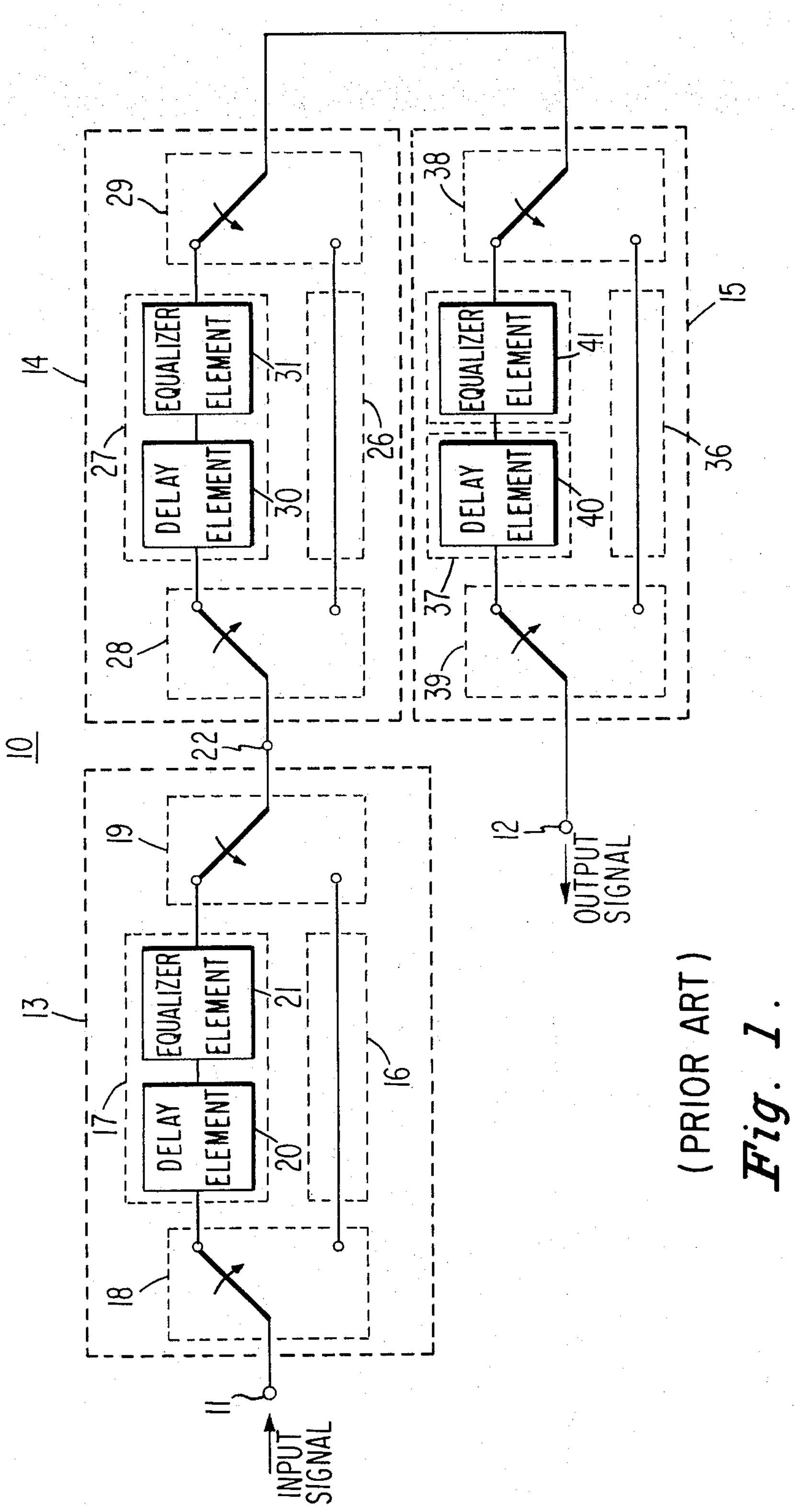
(PRIOR ART) Fig. 1.
FIG. 1 is a block diagram of a prior art digitally variable delay line system comprising multiple delay line sections.

Referring to FIG. 1, there is shown a block diagram of one type of a prior art system 10 that provides a digitally variable delay time for electrical signals as used, for example, in recording systems to reduce timing errors introduced by physical elements. System 10 selectively provides either negligible delay time or a predetermined delay time for electrical signals transmitted from input port 11 to output port 12. System 10 comprises a plurality of serially connected delay line sections 13, 14 and 15, each section contributing a finite digitally variable delay time to the overall system 10 delay time. Delay line sections 13, 14 and 15 include a first selectable transmission path 16, 26 and 36 of negligible signal delay time and a second transmission path 17, 27 and 37 having a relatively longer but not negligible signal delay time. The delay time provided by delay line section 13 is defined as the time required for a signal to be transmitted along second transmission path 17 relative to the transmission time required if the same signal were to be transmitted along first transmission path 16. Similarly, the delay time provided by delay line sections 14 and 15 is the time delay of signal transmission through their respective second transmission paths 27 and 37 relative to transmission time through their respective first transmission paths 26 and 36. Switching elements 18, 19, 28, 29, 38 and 39 associated with the respective delay line sections 13, 14 and 15 are used to select which of the alternative delay line section transmission paths 16 or 17, 26 or 27, 36 or 37 is to be used in the transmission of electrical signals through system 10 when switching elements 18, 19, 28, 29, 38 and 39 are acted upon either manually or in response to a switch bias signal, not shown. In practice, the operation of system 10 requires that the signal attenuation of the respective first transmission paths 16, 26 and 36, of any delay line section 13, 14 or 15 equal the signal attenuation of the respective second transmission paths 17, 27 and 37 of the same delay line section over the operating frequency bandwidth of system 10. This requirement is needed in order to avoid amplitude modulation of the time delayed output signal.

System 10, as shown in FIG. 1, illustrates a mode of operation in which an input electrical signal coupled to input port 11 and to second transmission path 17 of delay line section 13, via switch 18, operated as shown, is transmitted through delay element 20. Delay element 20 provides substantially all of the relative delay time contributed by delay line section 13 to the overall predetermined system delay time. The known prior art delay elements suitable for such purposes, such as lengths of coaxial transmission line, provide signal attenuation that is proportional to the time of electrical transmission from one end of the delay element to the other. The signal attenuation magnitude of prior art delay elements vary over the operating frequency bandwidth of system 10. The conventional prior art solution to the problem of a delay element having a frequency dependent signal attenuation is to provide a suitable attenuation equalizer element 21, 31 and 41 in the respective second transmission paths 17, 27 and 37 of each delay line section 13, 14 and 15. Each of the equalizer elements is chosen, for example, to track dynamically the signal attenuation contributed by delay element 20 over the system operating frequency bandwidth and to compensate for variations in signal attenuation of the second transmission path 17 relative to the signal attenuation of first transmission path 16. Equalizer element 21 may also compensate for small variations in relative signal delay time. An example of a prior art equalizer element 21 is a transversal filter of the type described in an article by H. E. Kallman entitled "Transversal Filters" published in Proc. I.R.E. Vol. 28, July 1940, pp. 302–310. Equalizer element 21 adds insertion loss to transmission path 17 which may be compensated for by the power gain of amplifiers, not shown, included in second transmission path 17 or elsewhere in system 10.

It should be appreciated that as the number of system 10 delay sections is increased, the complexity of system 10 is increased due to the need for additional attenuation equalizer elements 21 and amplifiers with greater power gains. Accordingly, the use of equalization elements 21, 31 and 41 in the second transmission paths 17, 27 and 37 of each delay line section 13, 14 and 15 in conventional delay line systems does not provide an economical means for compensating for variation in attenuation between the alternative transmission paths.

Figure 2:
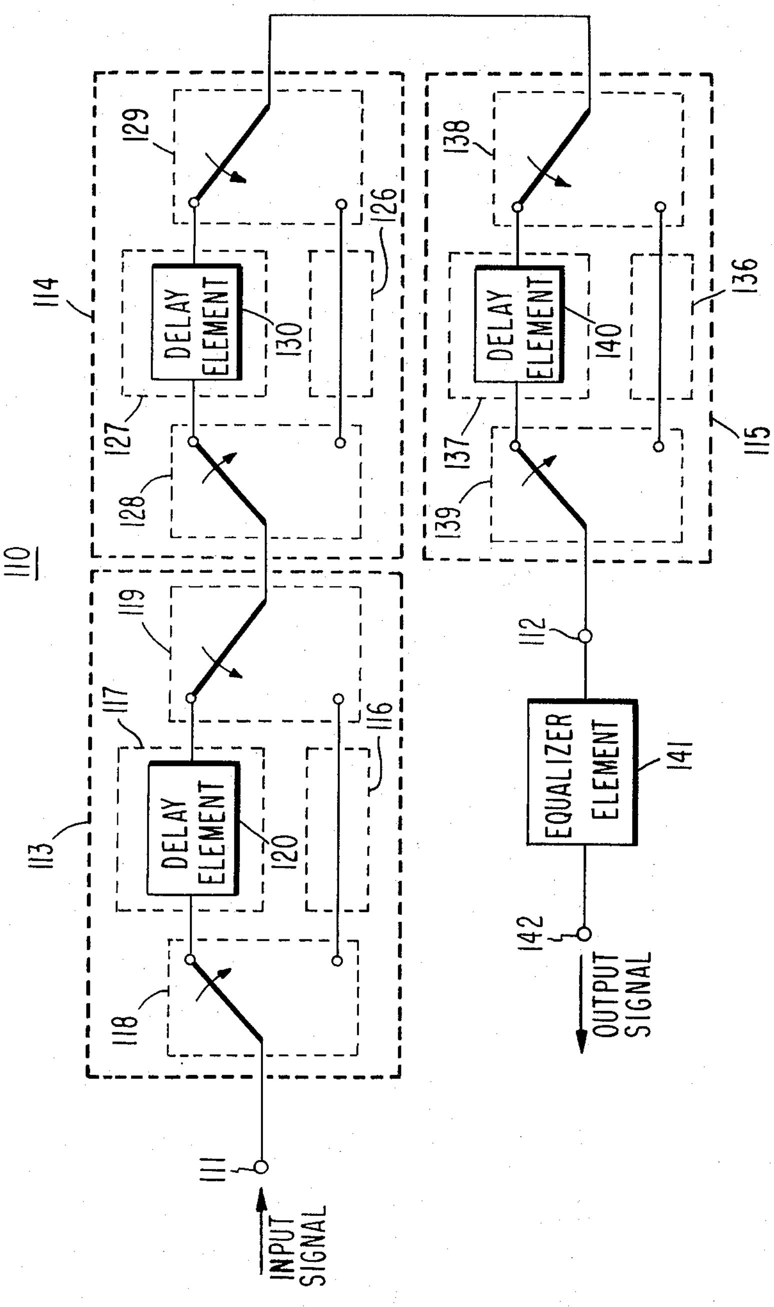
FIG. 2 is a block diagram of an embodiment of the present invention of a digitally variable delay line system that eliminates the need for attenuation equalizer elements in each delay line section.

Referring to FIG. 2, there is shown a preferred embodiment of a system 110 that provides, according to the present invention, a digitally variable delay time for electrical signals without the need of multiple attenuation equalizer elements such as elements 21 of the prior art, A system 110 includes a plurality of serially connected delay line sections 113, 114 and 115. System 110 selectively provides either a negligible delay time or a predetermined delay time of finite value for electrical signals transmitted from input port 111 to output port 112. Each serially connected delay line section 113, 114 and 115 contributes a finite digitally variable delay time to the overall system delay time. Delay line sections 113, 114 and 115 each comprise a first selectable transmission path 116, 126 and 136 negligible signal delay time signals and a second transmission path 117, 127 and 137 having a finite and thus relatively longer signal delay time. The delay time provided by delay line section 113, is the time difference required for a signal to be transmitted along second transmission path 117, relative to first transmission path 116. Similarly, the delay time provided by delay line sections 114 and 115 is the time delay of signal transmission through their respective second transmission paths 127 and 137 relative to transmission time through their respective first transmission paths 126 and 136. Switching elements 118, 119, 128, 129, 138 and 139 in the respective delay line sections 113, 114 and 115 are acted upon either manually or in response to a switching bias signal, not shown, to select which delay line section transmission path 116, 117, 126, 127, 136 or 137 is to be used in the transmission of electrical signals through system 110. It is a requirement of system 110 that the signal attenuation of the respective first transmission paths 116, 126 and 136 of delay line sections 113, 114 or 115 equal the signal attenuation of the respective second transmission paths 116, 126 and 136 of the same delay line section over the operating frequency bandwidth of system 110. This requirement is needed in order to avoid amplitude modulation of the time delayed output signal.

As an example, an input electrical signal coupled to input port 111 and to second transmission path 117 of delay line section 113 via switch 118 is transmitted through delay element 120 which provides substantially all of the delay time contributed by delay line section 113 to the overall predetermined system 110 delay time. Unlike the prior art digital delay time system 10 illustrated in FIG. 1, system 110 eliminates the need for attenuation equalizer element 20 in second transmission path 117, 127 and 137 of delay line sections 113, 114 and 115 as will be explained.

System 110 uses delay line sections 113, 114 and 115 that each have a first transmission path 116, 126 or 136 having a predetermined signal attenuation characteristic that tracks or follows the signal attenuation of second transmission path 117, 127 or 137 over the operating frequency bandwidth of system 110.

Delay element 120 and first transmission path 116 in delay line section 113 are both electrical transmission lines having different attenuation characteristics that track each other respectively over the operating frequency bandwidth of system 110. Similarly, delay element 130 and first transmission path 126 in delay line section 114 and delay element 140 and first transmission path 136 in delay line section 115 are both electrical transmission lines having different signal attenuation characteristics that track each other respectively over the operating frequency bandwidth.

An example of a suitable delay element 120 of dealy line section 113 is a predetermined length of coaxial cable having a predetermined magnitude of attenuation per unit length measurable over the operating frequency bandwidth of system 110. An example of first transmission path 116 of delay line section 113 is a length of coaxial cable that is electrically shorter than the coaxial cable comprising delay element 120 but has a predetermined magnitude of attenuation per unit length greater than the magnitude of attenuation per unit length of delay element 120 to cause the signal attenuation in paths 116 and 117 to be substantially equal over the desired frequency bandwidth of the system 110. The variation in attenuation with frequency of the coaxial transmission line comprising delay element 120 tracks the variation of attenuation with frequency of the coaxial transmission line comprising first transmission path 116. It will be understood, thus, that over the system 110 operating frequency bandwidth, the attenuation of the second electrically longer transmission path 117 equals or is substantially equal to the attenuation of the electrically shorter transmission path 116.

The electrical length of the coaxial transmission line comprising delay element 120 is longer than the electrical length of the coaxial transmission line comprising first transmission path 116. The difference in electrical length between the coaxial transmission line comprising delay element 120 and the coaxial transmission line comprising first transmission path 116 determines the desired delay time provided by delay line section 113. Thus, in accordance with one embodiment of system 110, delay line section 113 has at least two switchable coaxial transmission lines with different electrical lengths and different magnitudes of attenuation per unit length. If more than two switchable coaxial transmission lines with different electrical lengths and different magnitudes of attenuation per unit length were included in delay line section 113, then delay line section 113 would provide more than one digitally variable delay times relative to signal delay time provided by first transmission path 116.

The previously discussed analysis of delay line section 113 applies to all serially connected delay sections that may be included in system 110. Only three delay line sections 113, 114, and 115 are illustrated in system 110. However, this number is not to be considered as a limitation, since any number of serially connected delay line sections may be used in system 110.

The attenuation of coaxial transmission lines may vary in magnitude over the operating bandwidth of system 110. The selection of the electrical characteristics of a pair of coaxial transmission lines comprising a delay line section in system 110 eliminates the need for an attenuation equalizer element in each delay line section. However, in certain systems that may have variations in system output signal attenuation due to the combination of all the serially connected delay sections 113, 114 and 115 of system 110, one attenuation equalizer element 141, terminating delay section 115, may be used to compensate for the amplitude variation. The gain of a single amplifier, not shown, coupled to output port 142 of equalizer element 141 may be used to compensate for any system 110 attenuation.

In one embodiment of system 110, delay line section 113 is arranged to provide a maximum relative delay time of 100 nanoseconds in a system having suitably a 50 mHz bandwidth centered at 100 mHz. To achieve this delay time, second transmission path 117 of delay section 113 is formed of 100 feet of 0.141 inch diameter, semi-rigid coaxial cable having an attenuation of 0.036 db/ft at 100 mHz. First transmission path 116 of delay line section 113 is formed of 33 feet of 0.047 inch diameter semi-rigid coaxial cable having an attenuation of 0.112 db/ft at 100 mHz. Delay line section 114 of system 110 is arranged to provide a maximum relative delay time of 50 nanoseconds at 100 mHz. To achieve this delay time, second transmission path 130 of delay line section 114 is formed of 50 feet of 0.141 inch diameter, semi-rigid coaxial cable having an attenuation of 0.036 db/ft at 100 mHz. First transmission path 126 of delay line section 114 is formed of 16.5 feet of 0.047 inch diameter, semi-rigid coaxial cable having an attenuation of 0.112 db/ft at 100 mHz. Delay line section 115 of system 110 is arranged to provide a maximum relative delay time of 25 nanoseconds at 100 mHz. To achieve this delay time, second transmission path 137 of delay section 115 is formed of 25 feet of 0.141 inch diameter, semi-rigid coaxial cable having an attenuation of 0.036 db/ft at 100 mHz. First transmission path 136 of delay section 115 is formed of 8.25 feet of 0.047 inch diameter, semi-rigid coaxial cable having an attenuation of 0.112 db/ft at 100 mHz.

Switches 118, 119, 128, 129, 138 and 139 of system 110 provide a means for digitally selecting only the first transmission path of each delay line section or only the second transmission path of each delay line section or a combination of the first transmission path of one delay line section and the second transmission path of a second delay line section. It will be readily appreciated by those in the art to select relative delay times of discrete or digital values such as 0, 25, 50, 75, 100, 125, 150 and 175 nanoseconds for use in a system such as system 110.

A digitally variable time delay system has been described above in connection with a specific embodiment providing only three delay line sections which are used to provide digitally selected increments of delay time. It should be appreciated that the described embodiment providing only a specific number of delay time increments is only by way of example. Transmission lines other than coaxial cable may be used to implement the disclosed principles. Thus, many other arrangements can readily be devised in accordance with the described principles by those skilled in the art.

What is claimed is:

1. A system for providing a digitally variable delay time for electrical signals transmitted over an operating frequency bandwidth from a system input terminal to a system output terminal through a connection of multiple delay line sections each having a first selectable transmission path of negligible delay time and a second selectable transmission path, said second path having a predetermined delay time relative to said first transmission path delay time, the improvement comprising:

said first transmission path being a predetermined length of electrical transmission line having a predetermined magnitude of signal attenuation per unit length over said operating frequency bandwidth;

said second transmission path being an electrical signal transmission line having a predetermined length electrically longer than said predetermined length of said first electrical signal transmission line and having a predetermined magnitude of signal attenuation per unit length over said operating frequency bandwidth less than said predetermined magnitude of signal attenuation per unit length of said first electrical signal transmission line to cause signal attenuation in said first and second electrical signal transmission lines to be substantially equal over said operating frequency bandwidth and;

means for selecting either of said first and second transmission paths of said delay line sections.

2. A system according to claim 1, wherein said first and second electrical transmission lines are coaxial transmission lines.

3. A system according to claim 1, including an attenuation equalizer means having an input terminal connected to said system output terminal.

4. A system according to claim 3, including an amplifier having an input terminal connected to an output terminal of said attenuation equalizer means.

* * * * *